(12) United States Patent
Sagmeister et al.

(10) Patent No.: US 11,738,733 B2
(45) Date of Patent: Aug. 29, 2023

(54) ACTUATING ARRANGEMENT FOR A PARKING BRAKE OF A MOTOR VEHICLE AND MOTOR VEHICLE HAVING THE ACTUATING ARRANGEMENT

(71) Applicant: ZF FRIEDRICHSHAFEN AG, Friedrichshafen (DE)

(72) Inventors: Martin Sagmeister, Passau (DE); Gerhard Krieg, Thyrnau (DE); Stefan Igl, Vilshofen (DE); Daniel Nachbaur, Ravensburg (DE); Sebastian Steidle, Deggenhausertal (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/536,643

(22) Filed: Nov. 29, 2021

(65) Prior Publication Data
US 2022/0169227 A1    Jun. 2, 2022

(30) Foreign Application Priority Data
Dec. 1, 2020  (DE) ..................... 10 2020 215 108.3

(51) Int. Cl.
*B60T 17/08*   (2006.01)
(52) U.S. Cl.
CPC .......... *B60T 17/086* (2013.01); *B60T 17/083* (2013.01); *B60T 2201/06* (2013.01)

(58) Field of Classification Search
CPC ... B60T 2201/06; B60T 17/086; B60T 17/083
See application file for complete search history.

(56) References Cited

U.S. PATENT DOCUMENTS

| 2015/0144437 A1* | 5/2015 | Coding | F16D 65/40 188/52 |
|---|---|---|---|
| 2020/0072308 A1* | 3/2020 | Kocjan | B60T 17/083 |
| 2020/0198602 A1* | 6/2020 | Ishii | B60T 13/74 |

FOREIGN PATENT DOCUMENTS

| CN | 105102284 B | * 10/2017 | ............. B60T 1/005 |
|---|---|---|---|
| DE | 10 2008 000 280 A1 | 8/2009 | |
| RU | 2727212 C2 | * 7/2020 | ............. B60T 13/266 |

* cited by examiner

*Primary Examiner* — Melanie Torres Williams
(74) *Attorney, Agent, or Firm* — Finch & Maloney PLLC

(57) ABSTRACT

An actuating arrangement (1) for a parking brake of a motor vehicle, having a first actuating unit (5), for manual actuation of the parking brake, and a shaft (2) for transmitting braking forces (F1, F2) to at least one wheel brake cylinder (4) of a service brake of the motor vehicle. The first actuating unit (5) is operatively connected to the shaft (2) so that, when the first actuating unit (5) is actuated, a first braking force (F1) is transmitted via the shaft (2) to the at least one wheel brake cylinder (4). The actuating arrangement (1) has a second actuating unit (7) for the controllable actuation of the parking brake. The second actuating unit (7) is operatively connected to the shaft (2) so that, when the second actuating unit (7) is actuated, a second braking force (F2) is transmitted via the shaft (2) to the wheel brake cylinder (5).

14 Claims, 2 Drawing Sheets

ACTUATING ARRANGEMENT FOR A PARKING BRAKE OF A MOTOR VEHICLE AND MOTOR VEHICLE HAVING THE ACTUATING ARRANGEMENT

This application claims priority from German patent application Ser. No. 10 2020 215 108.3 filed Dec. 1, 2020.

FIELD OF THE INVENTION

The present invention relates to an actuating arrangement for a parking brake of a motor vehicle having the features of the independent claim(s). The invention furthermore relates to a motor vehicle having the actuating arrangement.

BACKGROUND OF THE INVENTION

Various parking brake systems are known which permanently lock the wheels, in particular the rear wheels, of a vehicle at a standstill. In addition to mechanically actuable hand brakes, which are engaged via a hand brake lever with a force exerted by the driver. Electrical actuating arrangements are also known which transmit a braking force to the wheel brake of the vehicle by means of an actuator.

DE 10 2008 000 280 A1 discloses a parking brake for a motor vehicle, wherein the parking brake comprises at least one electrically actuable device for engaging the parking brake with a predetermined force and for releasing the parking brake, which device tightens the parking brake if the braking force decreases. The electrically actuable device is embodied as an electrically actuable double cable puller which simultaneously actuates two hand brake cables or Bowden cables, wherein the hand brake cables or Bowden cables each act on a lever which is in each case operatively connected to a wheel brake cylinder. The lever system comprises a lever which is connected to the Bowden cable and is connected to a shaft for conjoint rotation therewith, wherein the shaft acts on the wheel brake cylinders via two coupling elements.

SUMMARY OF THE INVENTION

The object underlying the invention is to propose an actuating arrangement which is distinguished by precise and situation-dependent actuation of the parking brake. Moreover, a further object is to propose a corresponding vehicle.

This object is achieved by means of an actuating arrangement and a vehicle having the features of the independent claim(s). Preferred or advantageous embodiments of the invention will be found in the dependent claims, the following description and the accompanying figures.

The subject of the invention is an actuating arrangement which is designed and/or suitable for actuating a parking brake of a motor vehicle. In particular, the parking brake is used to lock at least one vehicle wheel when the vehicle is at a standstill and to assist in predetermined operating states of the motor vehicle. The motor vehicle is designed, in particular, as a commercial vehicle, preferably as an agricultural towing vehicle, in particular as a tractor.

The actuating arrangement has a first actuating unit, which is designed and/or suitable for manually actuating the parking brake. In particular, the first actuating unit has the function of locking the at least one vehicle wheel when the motor vehicle is at a standstill and/or in the parked state. The first actuating unit is preferably designed as a mechanically and/or electrically actuable hand brake.

The actuating arrangement has a shaft which is designed and/or suitable for transmitting braking forces to at least or precisely one wheel brake cylinder of a service brake of the motor vehicle. Here, the service brake has the function of slowing down the motor vehicle and/or bringing it to a standstill in a driving mode. The service brake preferably has a brake actuator, which acts directly on the wheel brake cylinders to actuate the service brake. Alternatively, however, the brake actuator can also be operatively connected to the wheel brake cylinders via the shaft. For example, the brake actuator can be designed as a hydro- or electromechanical brake actuator.

The first actuating unit is operatively connected to the shaft, with result that, when the first actuating unit is actuated, a first braking force is transmitted via the shaft to the at least one wheel brake cylinder. The shaft is preferably coupled in terms of movement to the at least one wheel brake cylinder via at least one coupling element or precisely one coupling element. As a particular preference, the shaft is designed as a summing shaft, which distributes the braking forces acting on the shaft to at least two wheel brake cylinders of the service brake, in particular the rear axle. Moreover, the first actuating unit can be coupled in terms of movement to the shaft via at least one transmission device, preferably a linkage and/or a cable pull.

Within the scope of the invention, it is proposed that the actuating arrangement has a second actuating unit, which is designed and/or suitable for the controllable actuation of the parking brake. The second actuating unit is operatively connected to the shaft, with result that, when the second actuating unit is actuated, a second braking force is transmitted via the shaft to the wheel brake cylinder. In particular, the second actuating unit has the function of controlling the second braking force in accordance with an operating state of the vehicle. In particular, the second actuating unit is designed to actuate the parking brake when starting and/or when changing gears on slopes in order to prevent the motor vehicle from rolling back. Alternatively or optionally, the second actuating unit is designed to actuate the parking brake when the motor vehicle is at a standstill after a fixed standstill time in order to lock the at least one vehicle wheel when the vehicle is at a standstill. In particular, the second actuating unit can be coupled in terms of movement to the shaft via at least one further transmission device. Alternatively, however, provision can also be made for the first and the second actuating unit to be coupled in terms of movement to the shaft via a common transmission device.

The advantage of the invention is, in particular, that the second controllable actuating unit enables the parking brake to be actuated independently of the manual actuating unit. Thus, the existing brake systems, in particular the service brake and the hand brake, can remain very largely unchanged. The additional controllable actuating unit enables the parking brake to be actuated much more quickly and precisely in accordance with defined operating states of the vehicle.

In one specific embodiment of the invention, it is envisaged that at least the second actuating unit is designed as a fluidic, in particular hydraulic, actuating unit. The fluidic actuating unit is preferably connected to a fluid system of the motor vehicle. For example, the hydraulic actuating unit is connected to a hydraulic system pressure supply of a transmission and/or of the service brake of the vehicle. Alternatively, however, it is also possible for the hydraulic actuating unit to be supplied with a hydraulic fluid via a separate hydraulic system. Alternatively, however, it is also possible for the second actuating unit to be designed as a pneumatic actuating unit. Fluidic actuation makes it possible to propose a controllable actuating unit which is distinguished by sensitive and continuously variable actuation of the parking brake.

In a further specific embodiment, it is envisaged that the second actuating unit has a spring-loaded cylinder which, on the one hand, is coupled in terms of movement to the shaft and, on the other hand, can be and/or is connected fluidically to the fluid system. In particular, the spring-loaded cylinder has a housing and a piston arranged therein, wherein the piston is can be moved in the housing to transmit the second braking force. The spring-loaded cylinder has a spring, by means of which the piston is preloaded. In particular, the piston delimits a pressure chamber to which a fluid pressure can be applied, wherein the fluid pressure counteracts a spring force of the spring. In this case, the spring-loaded cylinder can be adjusted between a braking position and a release position under the action of the fluid pressure. Preferably, when the fluid pressure is increased, the piston is transferred from the braking position into the release position or the second braking force is reduced. Correspondingly, when the fluid pressure is reduced, the piston is transferred by the spring from the release position into the braking position or the second braking force is increased. The use of a spring-loaded cylinder makes it possible to actuate the latter in a manner similar to a clutch, with the result that particularly simple and accurate actuation of the parking brake is implemented. Furthermore, the spring-loaded cylinder enables a braking torque to be transmitted to the vehicle wheels independently of the service brake, thus making it possible to carry out calibration of the vehicle clutch, e.g., on a test stand, without having to supply the service brake with a corresponding hydraulic pressure.

In one specific embodiment, it is envisaged that the second actuating unit has a first valve device, which can be switched between a basic position and at least or exactly one switching position in order to control the fluid pressure of the spring-loaded cylinder. In particular, the first valve device serves to control the second braking force as a function of the fluid pressure. The first valve device is connected in terms of flow to the spring-loaded cylinder via a fluid line, wherein a first flow path runs from a high-pressure side via the first valve device to the spring-loaded cylinder. The first flow path is blocked in the basic position of the first valve device and released in the switching position. Preferably, the fluid flows along the first flow path from the high-pressure side via the first valve device in the direction of the spring-loaded cylinder when the first valve device is switched in the switching position.

In a further specific embodiment, it is envisaged that the second actuating unit has a second valve device, which can be switched between a basic position and at least one switching position in order to release the spring-loaded cylinder. In particular, the second valve device serves to switch the spring-loaded cylinder into the braking position when the first valve device has been switched into the basic position and/or has failed. In this case, the second valve device is connected in terms of flow to the first valve device via a further fluid line, wherein a second flow path runs from the spring-loaded cylinder via the first and the second valve device to the low-pressure side. The second flow path is blocked in the basic position of the second valve device and released in the switching position. Preferably, the fluid flows along the second flow path from the spring-loaded cylinder via the first and second valve device in the direction of the low-pressure side when the second valve device is switched in the switching position. Thus, the fluid pressure in the pressure chamber is increased or the second braking force is reduced when the first valve device is in the switching position and the second valve device is in the basic position. Analogously to this, the fluid pressure in the pressure chamber is reduced or the second braking force is increased when the first valve device is switched to the basic position and the second valve device is switched to the switching position. The first and the second valve device are each preferably designed as a 3/2-way valve. In particular, the first and the second valve device are connected to a control unit of the vehicle, wherein the control unit is designed to control the first and/or the second valve device based on the operating state of the vehicle in order to increase or reduce the second braking force. The proposal is thus for an actuating unit which is distinguished by high operational reliability and, at the same time, by short actuation times of the parking brake.

In one design implementation, the first and/or the second valve device are/is designed as a continuous valve. In particular, the continuous valve serves to adjust the volume flow along the first or second flow path. For this purpose, the continuous valve can assume any desired number of intermediate positions between the basic position and the switching position. For example, the first and/or the second valve device can be designed as a proportional valve or as a control valve or as a servo valve. By using continuous valves, particularly precise adjustment of the fluid pressure can be implemented within a short time.

In an alternative or optionally supplementary implementation, the first and/or the second valve device are/is designed as a switching valve. In particular, the switching valve serves to selectively release or block the first or second flow path. For this purpose, the switching valve can assume either exactly the basic position or exactly the switching position. By using switching valves, a particularly simple and low-cost actuating unit can be achieved.

In a further specific implementation, it is envisaged that the second actuating unit has a third valve device, which can be switched between a basic position and at least one switching position and is designed and/or suitable for releasing the spring-loaded cylinder in the event of a failure of the second valve device. In particular, the third valve device serves to discharge a leakage flow which can occur when the first valve device is configured as a proportional valve. In this case, the third valve device is arranged in parallel with the second valve device by means of a bypass line. In particular, the bypass line serves to bridge the second valve device in terms of flow, the bypass line being branched off ahead of the second valve device. In particular, a third flow path runs from the spring-loaded cylinder via the third valve device to the low-pressure side. The third flow path is released in the basic position of the third valve device and blocked in the switching position. Preferably, the fluid flows along the third flow path from the spring-loaded cylinder in the direction of the low-pressure side when the first and the second valve device are switched in the basic position and/or have failed. The third valve device is preferably designed as a 2/2-way valve. The third valve device prevents an increase in the fluid pressure in the pressure chamber resulting from leakage flows, thus ruling out unwanted actuation of the parking brake in the event of a failure of the actuating arrangement. Using the third valve device thus makes it possible to design at least the first valve device as a simple proportional valve with low leakage, thus enabling the second actuating unit to be produced at particularly low cost.

In a further embodiment, provision is made for the second actuating unit to have a pressure detection device which is designed and/or suitable for detecting a fluid pressure of the spring-loaded cylinder, wherein the first and/or the second valve device can be subjected to closed-loop and/or open-loop control on the basis of the detected fluid pressure. In particular, the pressure detection device is connected to the control unit by signal technology, the control unit being designed to perform closed-loop or open-loop control of the first and/or second valve devices on the basis of the detected fluid pressure. For example, for defined operating states, an associated desired value for the fluid pressure can be stored in the control unit, the second braking force being subjected to closed-loop or open-loop control as a function of the fluid pressure. In particular, the fluid pressure thus serves as a controlled variable. In terms of flow, the pressure detection device is preferably integrated into the fluid line between the first valve device and the spring-loaded cylinder. The pressure detection device can be designed as a pressure sensor. In particular, the use of a pressure sensor makes it possible to achieve particularly accurate control of the parking brake as a function of the fluid pressure. Alternatively, the pressure detection device can be designed as a pressure switch. In particular, the use of a pressure switch makes it possible to achieve particularly robust and low-cost detection of the fluid pressure.

In another implementation, it is envisaged that the second actuating unit has a non-return valve, wherein the non-return valve is arranged on the high-pressure side upstream of the first valve device. In particular, the non-return valve has the function of permitting a flow of the fluid from the high-pressure side in the direction of the first valve device and of blocking a return flow from the first valve device to the high-pressure side. In particular, the non-return valve is designed as a spring-loaded non-return valve, preferably a ball-type non-return valve. The use of the non-return valve makes it possible to ensure a constant setting of the fluid pressure.

In a further development, it is envisaged that the second actuating unit has a filter device which is designed and/or suitable, in particular, for filtering foreign particles out of the fluid. In this case, the filter device is arranged on the high-pressure side upstream of the first valve device. The filter device can optionally be arranged upstream or downstream of the non-return valve. More specifically, the filter device can be arranged at a pressure inlet of the non-return valve or of the first valve device. The filter device is preferably designed as a dirt screen. By means of the filter device, the operational reliability of the parking brake can be increased and the risk of damage to the components of the second actuating unit by foreign particles can be reduced.

In a further possible embodiment, provision is made for the second actuating unit to have a pressure accumulator which is designed and/or suitable for storing a fluid pressure. In particular, the pressure accumulator is designed as a hydraulic accumulator, which delivers the stored fluid pressure in the form of hydraulic energy when discharged. The pressure accumulator is arranged on the high-pressure side upstream of the first valve device of the second actuating unit. In particular, the pressure accumulator is automatically charged by the prevailing system pressure of the fluid system during engine operation of the vehicle, the stored fluid pressure being redundantly available, that is to say even when the system pressure drops and/or when the engine is at a standstill, to actuate the parking brake. The first actuating unit is preferably formed by the pressure accumulator. The pressure accumulator thus completely replaces the mechanical or electrical actuating unit, and it is thus possible to achieve particularly compact and purely fluidically actuable actuation of the parking brake by means of the pressure accumulator.

In a preferred implementation, provision is made for the second actuating unit to be designed and/or suitable for implementing a hill-starting aid, also known as a "hill holder". In particular, the parking brake is engaged manually by the driver and/or automatically during a gear change when the vehicle is on a slope. Alternatively or as an optional supplementary measure, the second actuating unit is designed and/or suitable for implementing an automatic parking lock. In particular, for this purpose, the parking brake is automatically engaged after a fixed standstill time in order to ensure reliable retention of the vehicle on slopes. For example, the standstill time can be more than 10 seconds, preferably more than 30 seconds, in particular more than 50 seconds. In particular, the parking brake is released in a self-acting or automatic way by the second actuating unit as a function of at least one vehicle parameter, e.g. engine and/or transmission parameters, in particular during the implementation of the hill-starting aid and/or of the parking lock. For example, the parking brake is released by the second actuating unit when the vehicle clutch engages.

A further subject of the invention relates to a vehicle having the actuating arrangement as already described above.

BRIEF DESCRIPTION OF THE DRAWINGS

Further features, advantages and effects of the invention will be found in the following description of preferred exemplary embodiments of the invention. In the drawings.

DETAILED DESCRIPTION OF THE PREFERRED EMBODIMENTS

Figure 1:
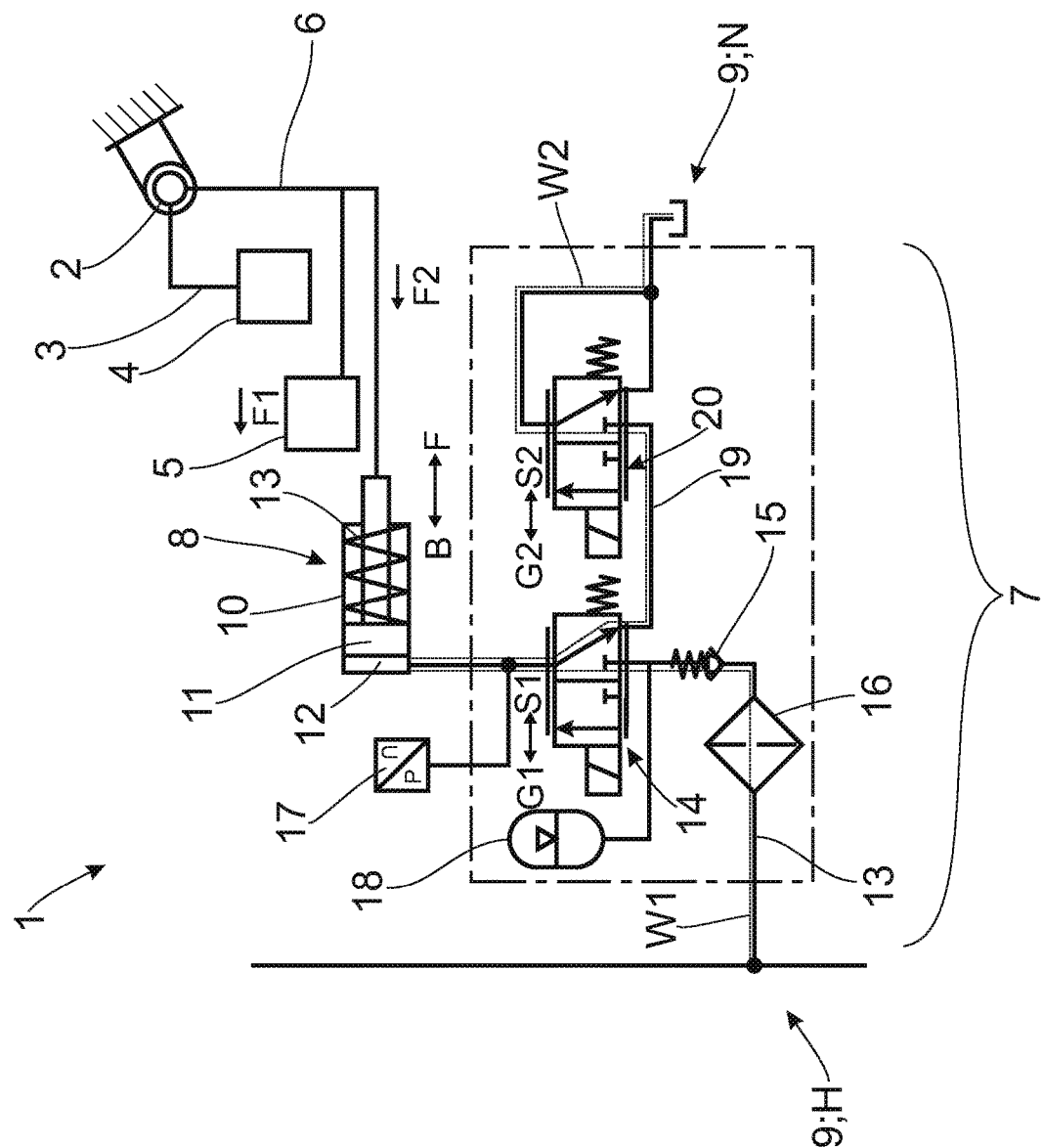
FIG. 1 shows a schematic illustration of an actuating arrangement for a vehicle as an exemplary embodiment of the invention.

FIG. 1 shows, in a highly schematic illustration, an actuating arrangement 1 which is set up for actuating a parking brake of a motor vehicle. The parking brake has the function of braking and/or locking one or more wheels, in particular the wheels on the rear axle of the vehicle, in accordance with an operating state of the vehicle. The motor vehicle is, in particular, an agricultural utility vehicle, e.g. a tractor.

The actuating arrangement 1 has a shaft 2, which is operatively connected via at least one coupling element 3, e.g. a coupling rod, to one or more wheel brake cylinders 4 of a service brake of the vehicle. For example, the shaft 2 is connected to the two wheel brake cylinders of the rear axle in each case via a coupling element 3.

The actuating arrangement 1 has a first actuating unit 5, which serves for the manual actuation of the parking brake and transmits a first braking force F1 to the shaft 2 and thus to the wheel brake cylinders 4. The first actuating unit 5 has, in particular, the function of locking the vehicle wheels when the vehicle is stationary and/or parked. The first actuating unit 5 can be designed, for example, as a mechanical hand brake lever, which can be actuated by manual force. Alternatively, the first actuating unit 5 is designed as an electrical actuating unit, which can be actuated by hand or by pressing a button. For this purpose, the electrical actuating unit 5 has, for example, an electromechanical actuator, which is set up to generate the first braking force F2. The first actuating unit 5 is coupled in terms of movement to the shaft 2, for example via a transmission device 6, e.g. a Bowden cable and/or a linkage and/or a lever, in order to transmit the first braking force F1 to the shaft 2.

The actuating arrangement 1 has a second actuating unit 7, which serves for the controllable manual actuation of the parking brake and transmits a second braking force F2 to the shaft 2 and thus to the wheel brake cylinders 4. For example, the first and the second actuating unit 5, 7 can be coupled in terms of movement to the shaft 2 via a common transmission device 6, wherein, when the first actuating unit 5 is actuated, the first braking force F1 and, when the second actuating unit 6 is actuated, the second braking force F2 are transmitted to the shaft 2 via the transmission unit 6 and distributed to the wheel brake cylinders 4.

The second actuating unit 7 has a spring-loaded cylinder 8, which, on the one hand, is coupled in terms of movement to the shaft 2 via the transmission device 6 and, on the other hand, is connected fluidically to a fluid system 9 of the vehicle. The fluid system 9 is designed as a hydraulic system, for example, and can be formed by a system pressure supply of the service brake or of a transmission, for example. Alternatively, the second actuating unit 7 is connected to a separate hydraulic system, in particular a hydraulic system independent of the service brake or the transmission.

The spring-loaded cylinder 8 comprises a housing 10, in which a piston 11 can be moved axially between a braking position B and a release position F. With one side, the piston 11 delimits a pressure chamber 12 to which a fluid pressure can be applied, and it is supported on the other side in the housing 10 via a spring 13. The spring 13 acts on the piston 11 in the direction of the braking position B with a spring force which is transmitted via the shaft 2 to the wheel brake cylinders 4 as the second braking force F2 in order to actuate the parking brake. When the fluid pressure is applied to the pressure chamber 12, the piston is transferred into the release position F against the spring force in order to release the parking brake.

The pressure chamber 12 is connected via a fluid line 13 to a high-pressure side H of the fluid system 9. The second actuating unit 7 has a first valve device 14, which is incorporated into the fluid line 13 to control the fluid pressure and can be switched between a basic position G1 and at least one switching position S1. In the illustration shown, the first valve device 14 is designed as a 3/2-way proportional valve, which can assume any desired number of intermediate positions between the basic position G1 and the switching position S1. For the sake of simplicity, however, the proportional valve can also be replaced by a switching valve.

Furthermore, the first actuating unit 7 has a non-return valve 15 and a filter device 16, which are integrated into the fluid line 13 upstream of the first valve device 14 in terms of flow. The non-return valve 15 is designed, for example, as a ball-type non-return valve, which is designed to prevent a return flow from the first valve device 14 in the direction of the high-pressure side H. For example, the filter device 16 is designed as a filter screen in order to filter foreign particles out of the fluid. In the exemplary embodiment shown, the filter device 16 is arranged upstream of the non-return valve 15. Alternatively, however, it is also possible for the filter device 16 to be integrated at the pressure inlet of the first valve device 14 or of the non-return valve 15.

In addition, the second actuating unit 7 has a pressure detection device 17, which is designed to detect the fluid pressure of the spring-loaded cylinder 8. For this purpose, the pressure detection device 17 is integrated into the fluid line 13 between the first valve device 14 and the spring-loaded cylinder 8. For example, the pressure detection device 17 is designed as a pressure sensor. However, in order to simplify the second actuating unit 7, it is also possible for the pressure sensor to be replaced by a pressure switch.

A first flow path W1 runs from the high-pressure side H via the filter device 16, the non-return valve 15 and the first valve device 14 to the spring-loaded cylinder 8 or into its pressure chamber 12. Here, the first flow path W1 is blocked in the basic position G1 of the first valve device 14 and released in the switching position S1.

The first valve device 14 is connected via a further fluid line 19 to a low-pressure side N of the fluid system 9. The second actuating unit 7 has a second valve device 20, which is incorporated into the fluid line 18 to release the spring-loaded cylinder 8 and can be switched between a basic position G2 and at least one switching position S2. In the illustration shown, the second valve device 20 is designed as a 3/2-way switching valve, which can be switched precisely between the basic position G2 and the switching position S2.

A second flow path W2 thus runs from the spring-loaded cylinder 8 or from its pressure chamber 12 via the first and the second valve unit 14, 20 to the low-pressure side N of the fluid system 9. In this case, the second flow path W2 is blocked in the switching position S1 of the first valve device 14 and/or in the basic position G2 of the second valve device 20 and is released in the basic position G1 of the first valve device 14 and in the switching position S2 of the second valve device 20.

In a driving mode of the vehicle, the first valve device 14 is switched into the switching position S1 and the second valve device 20 is switched into the basic position G2, and therefore the first flow path W1 is released and the fluid pressure is applied to the spring-loaded cylinder 8 to select the release position F. In order to actuate the parking brake 8, the first valve device 14 is switched into the basic position G1 and the second valve device 20 is switched into the switching position S2, thus blocking the first flow path W1 and releasing the second flow path W2 in order to reduce the fluid pressure in the pressure chamber 12. The spring-loaded cylinder 8 is switched automatically into the braking position B by the spring 13, with the result that the second braking force F2 is transmitted to the shaft 2.

In an alternative embodiment, the second actuating unit 7 can have a pressure accumulator 18, which is used to store a fluid pressure in order to obtain a redundant energy supply. The pressure accumulator 18 is connected into the fluid line 13 between the non-return valve 15 and the first valve device 14 in terms of flow. The pressure accumulator 18 serves, in particular, to generate the first braking force F1 in the form of hydraulic energy, and therefore the first actuating unit 5 is formed by the pressure accumulator 18, and mechanical or electrical actuation is eliminated. For this purpose, in particular, the fluid is stored under pressure in the pressure accumulator 18, hydraulic energy being released when the pressure accumulator 18 is discharged in order to transfer the spring-loaded cylinder 8 from the braking position B into the release position F when the engine is at a standstill and/or when the fluid pressure is low.

In particular, the first and the second valve device 14, 20 automatically assume the respective basic position G1, G2 when an energy supply is interrupted. For example, in the embodiment with pressure accumulator 18, the first valve device 14 can be permanently supplied with energy via an energy accumulator device, e.g., a battery, thus enabling the first valve device 14 to be switched into the switching position S1 by the pressure accumulator 18 to actuate the spring-loaded cylinder 8, even when the engine is at a standstill.

The pressure detection device 17 is connected, by signal technology for example, to a control unit of the vehicle, wherein the control unit is designed to perform closed-loop or open-loop control of the first and the second valve device 14, 20 on the basis of the fluid pressure. For example, the control unit can control the first and the second valve unit 14, 20 in order to implement a hill-starting aid, particularly in the case of power-shift transmissions. For this purpose, the parking brake can be activated manually by the driver during a gear change or when starting on a slope by an actuation of the second actuating unit 7. In this case, the control unit is designed to control the two valve devices 14, 20 on the basis of at least one vehicle parameter, e.g., an engine and/or transmission parameter, and to perform closed-loop or open-loop control of the second braking force F2 as a function of the fluid pressure. In this way, the parking brake can be released automatically when the clutch bites, for example. Alternatively or optionally as a supplementary measure, the control unit is designed to actuate the first and the second valve unit 14, 20 in order to implement an automatic parking lock, wherein the second actuating unit 7 can actuate the parking brake after a fixed standstill time, e.g. 30 seconds, for this purpose.

The use of the spring-loaded cylinder 8 with hydraulic actuation makes it possible to implement an automatic parking brake and to actuate the spring-loaded cylinder 8 in a manner similar to a clutch. This system can respond significantly faster than known electromechanical solutions. Moreover, the use of a spring-loaded cylinder 8 makes it possible to automatically calibrate the clutches when the vehicle is at a standstill, in particular on a test stand. A further advantage is that the additional actuating unit enables an automatic parking brake to be implemented while retaining the existing braking device.

Figure 2:
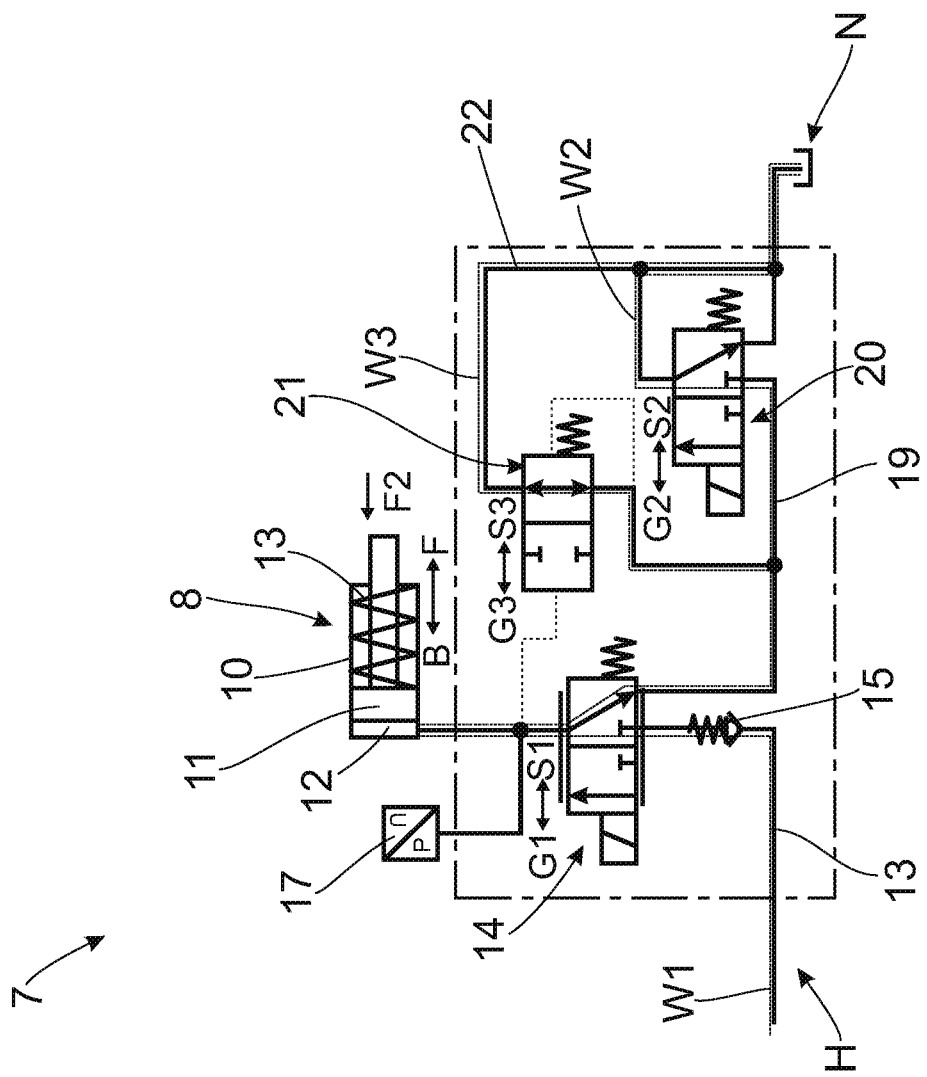
FIG. 2 shows a schematic illustration of a second actuating unit of the actuating arrangement according to FIG. 1 as an alternative exemplary embodiment of the invention.

FIG. 2 shows the second actuating unit 7 in an alternative embodiment, illustrated in the same way as in FIG. 1. Here, the basic functioning and the structure are comparable to the embodiment of FIG. 1, for which reason only the essential differences will be discussed below.

In this exemplary embodiment, the second actuating unit 7 additionally has a third valve device 21, which is connected in terms of flow to the low-pressure side N via a bypass line 22 in parallel with the second valve device 20. Here, the bypass line 22 serves to bridge the second valve device 20, wherein, for this purpose, the bypass line 22 branches off from the further fluid line 19 upstream of the second valve device 20 and is connected again to the further fluid line 19 in terms of flow downstream of the second valve device 20. In this case, a third flow path W3 runs in parallel with the second flow path W2 from the spring-loaded cylinder 8 via the first and the third valve device 14, 21 to the low-pressure side N. The third valve device 21 is designed as a 2/2-way switching valve which can be switched between a basic position G3 and a switching position S3. Here, the third flow path W3 is released in the basic position G3 of the third valve device 21 and is blocked in the switching position S3.

In a driving mode of the vehicle, the third valve device 21 is switched in the switching position S3 in order to block the third flow path W3. To actuate the parking brake 8, the first valve device 14 is switched into the basic position G1 and the second valve device 20 is switched into the switching position S2 and/or the third valve device 21 is switched into the basic position G3, thus releasing the second and/or the third flow path W2, W3 and reducing the fluid pressure in the pressure chamber 12 in order to actuate the parking brake.

In particular, the third valve device 21 automatically assumes the basic position G3 when an energy supply is interrupted, thus ensuring that at least the third flow path W3 is released in the event of a failure of the system, in particular in the event of a failure of the second valve device 20. As a result, it is possible to use a proportional valve with low leakage as the first valve device 14, wherein discharge of the leakage flow is ensured via the third flow path W3. This prevents an uncontrolled rise in the fluid pressure due to leakage of the first valve device 14 and release of the parking brake in the event of a failure of the second actuating unit 7 or of the second valve device 20. Moreover, a simple proportional valve can be used for the first valve device 14, thus enabling the second actuating unit 7 to be configured in a low-cost manner.

REFERENCE SIGNS

1 actuating arrangement
2 shaft
3 coupling element
4 wheel brake cylinders
5 actuating unit
6 transmission device
7 actuating unit
8 spring-loaded cylinder
9 fluid system
10 housing
11 piston
12 pressure chamber
13 spring
14 valve device
15 non-return valve
16 filter device
17 pressure detection device
18 fluid line
19 fluid line
20 valve device
21 valve device
22 bypass line
B braking position
F1, F2 braking forces
F release position
G1, G2, G3 basic position
S1, S2, S3 switching position
W1, W2, W3 flow path
H high-pressure side
N low-pressure side

The invention claimed is:

1. An actuating arrangement for a parking brake of a motor vehicle comprising:
a first actuating unit for manual actuation of the parking brake, and
a shaft for transmitting braking forces to at least one wheel brake cylinder of a service brake of the motor vehicle,
wherein the first actuating unit is operatively connected to the shaft, with the result that, when the first actuating unit is actuated, a first braking force is transmitted to the at least one wheel brake cylinder of the service brake via the shaft, a second actuating unit for the controllable actuation of the parking brake, the second actuating unit is operatively connected to the shaft, with the result that, when the second actuating unit is actuated, a second braking force is transmitted to the at least one wheel brake cylinder of the service brake via the shaft such that the actuation of the parking brake, via the second braking force, by the second actuating unit is independent of the actuation of the parking brake, via the first braking force, by the first actuating unit.

2. The actuating arrangement according to claim 1, wherein at least the second actuating unit is designed as a fluidic actuating unit.

3. The actuating arrangement according to claim 1, wherein the second actuating unit has a spring-loaded cylinder, the spring-loaded cylinder is coupled in terms of movement to the shaft and is fluidically connectable to a fluid system of the vehicle, and the spring-loaded cylinder is switchable from a braking position into a release position under the action of a fluid pressure.

4. The actuating arrangement according to claim 3, wherein the second actuating unit has a first valve device, which is switchable between a basic position and at least one switching position, for controlling the fluid pressure of the spring-loaded cylinder, the first valve device is connected in terms of flow to the spring-loaded cylinder via a fluid line, a first flow path from a high-pressure side of the fluid system, in a direction of the spring-loaded cylinder, is blocked in the basic position and is released in the at least one switching position.

5. The actuating arrangement according to claim 4, wherein the second actuating unit has a filter device, and the filter device is arranged on the high-pressure side upstream of the first valve device in terms of a flow direction.

6. The actuating arrangement according to claim 4, wherein the second actuating unit has a pressure accumulator for storing a fluid pressure, the pressure accumulator is arranged on the high-pressure side upstream of the first valve device in terms of a flow direction, and stored fluid pressure is manually releasable in order to switch the spring-loaded cylinder from the braking position into the release position.

7. A motor vehicle having the actuating arrangement according to claim 1.

8. The actuating arrangement according to claim 4, wherein the second actuating unit has a non-return valve, and the non-return valve is arranged on the high-pressure side upstream of the first valve device in terms of a flow direction.

9. An actuating arrangement for a parking brake of a motor vehicle comprising:

a first actuating unit for manual actuation of the parking brake, and a shaft for transmitting braking forces to at least one wheel brake cylinder of a service brake of the motor vehicle, wherein the first actuating unit is operatively connected to the shaft, with the result that, when the first actuating unit is actuated, a first braking force is transmitted to the at least one wheel brake cylinder of the service brake via the shaft, a second actuating unit for the controllable actuation of the parking brake, the second actuating unit is operatively connected to the shaft, with the result that, when the second actuating unit is actuated, a second braking force is transmitted to the at least one wheel brake cylinder of the service brake via the shaft, wherein the second actuating unit has a spring-loaded cylinder, the spring-loaded cylinder is coupled in terms of movement to the shaft and is fluidically connectable to a fluid system of the vehicle, and the spring-loaded cylinder is switchable from a braking position into a release position under the action of a fluid pressure, wherein the second actuating unit has a first valve device, which is switchable between a basic position and at least one switching position, for controlling the fluid pressure of the spring-loaded cylinder, the first valve device is connected in terms of flow to the spring-loaded cylinder via a fluid line, a first flow path from a high-pressure side of the fluid system, in a direction of the spring-loaded cylinder, is blocked in the basic position and is released in the at least one switching position, and wherein the second actuating unit has a second valve device, which is switchable between a basic position and at least one switching position, for releasing the spring-loaded cylinder, the second valve device is connected in terms of flow to the first valve device via a further fluid line, a second flow path from the spring-loaded cylinder via the first valve device, in a direction of a low-pressure side of the fluid system, is blocked in the basic position and is released in the switching position.

10. The actuating arrangement according to claim 9, wherein at least one of the first and the second valve devices is designed as a continuous valve.

11. The actuating arrangement according to claim 9, wherein at least one of the first and the second valve device is designed as a switching valve.

12. The actuating arrangement according to claim 9, wherein the second actuating unit has a third valve device, which is switchable between a basic position and at least one switching position, for releasing the spring-loaded cylinder in an event of failure of the second valve device, the third valve device is arranged by a bypass line in parallel with the second valve device, and a third flow path from the spring-loaded cylinder, via the third valve device, in a direction of the low-pressure side is released in the basic position of the third valve device and is blocked in the switching position of the third valve device.

13. The actuating arrangement according to claim 9, wherein the second actuating unit has a pressure detection device for detecting a fluid pressure of the spring-loaded cylinder, and at least one of the first and the second valve devices is controlled on a basis of detected fluid pressure.

14. An actuating arrangement for a parking brake of a motor vehicle comprising:

a first actuating unit for manual actuation of the parking brake, a shaft for transmitting braking forces to at least one wheel brake cylinder of a service brake of the motor vehicle, wherein the first actuating unit is operatively connected to the shaft, with the result that, when the first actuating unit is actuated, a first braking force is transmitted to the at least one wheel brake cylinder of the service brake via the shaft, a second actuating unit for the controllable actuation of the parking brake, the second actuating unit is operatively connected to the shaft, with the result that, when the second actuating unit is actuated, a second braking force is transmitted to the at least one wheel brake cylinder of the service brake via the shaft, and wherein the second actuating unit is designed to implement at least one of a hill-starting aid and an automatic parking lock.

\* \* \* \* \*